United States Patent
Ikenoue (10) Patent No.: US 9,049,397 B2
(45) Date of Patent: Jun. 2, 2015

(54) IMAGE PROCESSING DEVICE AND IMAGE PROCESSING METHOD

(75) Inventor: Shoichi Ikenoue, Chiba (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 267 days.

(21) Appl. No.: 13/513,352

(22) PCT Filed: Sep. 6, 2010

(86) PCT No.: PCT/JP2010/005469
§ 371 (c)(1),
(2), (4) Date: Jul. 24, 2012

(87) PCT Pub. No.: WO2011/067881
PCT Pub. Date: Jun. 9, 2011

(65) Prior Publication Data
US 2012/0294533 A1    Nov. 22, 2012

(30) Foreign Application Priority Data
Dec. 3, 2009   (JP) ................. 2009-275565

(51) Int. Cl.
*G06K 9/32* (2006.01)
*G06K 9/00* (2006.01)
(Continued)

(52) U.S. Cl.
CPC ............ *H04N 1/3877* (2013.01); *G06T 7/0044* (2013.01); *G06T 2207/30201* (2013.01); *G06K 9/00241* (2013.01); *G06K 9/3208* (2013.01); *G06K 9/3275* (2013.01)

(58) Field of Classification Search
None
See application file for complete search history.

(56) References Cited

U.S. PATENT DOCUMENTS 5,077,811 A * 12/1991 Onda ............................ 382/290
6,185,343 B1   2/2001 Ikeda et al.
6,965,693 B1* 11/2005 Kondo et al. ................. 382/190
(Continued)

FOREIGN PATENT DOCUMENTS

JP    7-220026    8/1995
JP    10-206134   8/1998
(Continued)

OTHER PUBLICATIONS

Kono, et al. (Computer English Translation of Japanese Patent No. 2009-010452), pp. 1-14.*
(Continued)

*Primary Examiner* — Daniel Mariam
(74) *Attorney, Agent, or Firm* — Katten Muchin Rosenman LLP (57) ABSTRACT

A face detection processing unit performs a face detection process by rotating an image in increments of a predetermined angle and acquires a rotation angle at which a face is detected. An angle correction unit acquires an angle between the face and a shoulder by pattern matching and corrects the rotation angle of the image. A human-image orientation identification unit identifies a correct orientation of a human image based on the rotation angle. An image-characteristic analysis unit analyzes a frequency distribution and a brightness distribution of a non-human image. A non-human image orientation identification unit identifies the correct orientation of a non-human image based on distribution characteristics of a frequency of brightness with respect to an axis in a predetermined direction. An image-data updating unit incorporates information regarding the correct orientation in the image data.

12 Claims, 6 Drawing Sheets

(51) Int. Cl.
*H04N 1/387* (2006.01)
*G06T 7/00* (2006.01)

(56) References Cited

U.S. PATENT DOCUMENTS

| | | | | |
|---|---|---|---|---|
| 7,565,030 | B2 * | 7/2009 | Steinberg et al. | 382/296 |
| 7,706,579 | B2 * | 4/2010 | Oijer | 382/118 |
| 7,995,239 | B2 * | 8/2011 | Yonaha | 358/1.9 |
| 8,564,673 | B2 * | 10/2013 | Omi | 348/207.99 |
| 2005/0093891 | A1 * | 5/2005 | Cooper | 345/649 |
| 2005/0104848 | A1 * | 5/2005 | Yamaguchi et al. | 345/156 |
| 2005/0231525 | A1 * | 10/2005 | Habuta et al. | 345/591 |
| 2006/0061599 | A1 * | 3/2006 | Yu et al. | 345/649 |
| 2008/0266326 | A1 * | 10/2008 | Porwal | 345/659 |

FOREIGN PATENT DOCUMENTS

| | | |
|---|---|---|
| JP | 2006-350642 | 12/2006 |
| JP | 2009-10452 | 1/2009 |

OTHER PUBLICATIONS

International Search Report dated Oct. 26, 2010, from corresponding International Application No. PCT/JP2010/005469.
International Preliminary Report on Patentability and Written Opinion of the International Search Authority dated Jul. 10, 2012, from corresponding International Application No. PCT/JP2010/005469.

* cited by examiner

IMAGE PROCESSING DEVICE AND IMAGE PROCESSING METHOD

TECHNICAL FIELD

The present invention relates to information processing techniques and in particular to an image processing device for processing an image of a photograph or the like and to an image processing method performed therein.

BACKGROUND ART

In recent years, for example, with a growing use of image-capturing devices such as digital cameras and a development of image processing techniques, there has been an increase in opportunities to display an image of a captured photograph or the like on a display so as to select a target image to be edited or printed, to enjoy the image in a slide-show format, or the like. There is also a case where a plurality of thumbnails of images are printed. In image data, regardless of whether the correct orientation for the composition is vertical or horizontal, pixel values are normally recorded based on the position of an image-receiving element. Thus, an image at the time of display is basically displayed in an orientation that is the same regardless of the composition thereof.

Therefore, it is necessary for a user to individually rotate an image to a correct orientation after the image is displayed or to edit the orientation to the correct orientation on an edit screen so as to set the image as content for a slid show or the like. As one of methods for supporting this task, a technique has been suggested for detecting a skin area of a human figure and then determining the vertical direction of a photograph in accordance with the direction of the alignment of the skin area (see, for example, patent document No. 1).

[Patent Document No. 1] Japanese Patent Application Publication No. 2006-350642

SUMMARY OF THE INVENTION

Problem to be Solved by the Invention

However, since the above technique uses a color feature of an image, robustness for a light source environment, the color of clothes, and the positions of arms and legs is weak. Also, since the vertical direction is determined based on the alignment of a face, it is assumed that a plurality of people are being captured side by side. Thus, applicable photographs are limited.

In this background, a purpose of the present invention is to provide an image-orientation determination technique that can be applied to images with various subjects and composition.

Means to Solve the Problem

One embodiment of the present invention relates to an image processing device. The image processing device comprises: an object detection processing unit configured to detect, by performing pattern matching between an image to be processed and a reference image of an object, the object in the image to be processed, while changing a relative angle of the images; an object-image orientation identification unit configured to determine the top and the bottom of the image corresponding to the top and the bottom of the object, based on the relative angle at which the object is detected by the object detection processing unit, so as to identify a correct orientation of the image; and an image-data updating unit configured to update data of the image so that the image is displayed in the identified orientation.

Another embodiment of the present invention relates to an image processing method. The image processing method comprises: reading out data of a specified image from a memory device and then detecting, by performing pattern matching between the image and a comparison image of an object, the object in the image, while changing a relative angle of the images; determining the top and the bottom of the image that correspond to the top and the bottom of the object, based on the relative angle at which the object is detected, so as to identify a correct orientation of the image; and updating the data of the image so that the image is displayed in the identified orientation.

Optional combinations of the aforementioned constituting elements, and implementations of the invention in the form of methods, apparatuses, systems, computer programs, and recording media recording computer programs may also be practiced as additional modes of the present invention.

Advantage of the Present Invention

According to the present invention, an image can be displayed in a correct orientation with a little burden on the user.

BEST MODE FOR CARRYING OUT THE INVENTION

Figure 1:
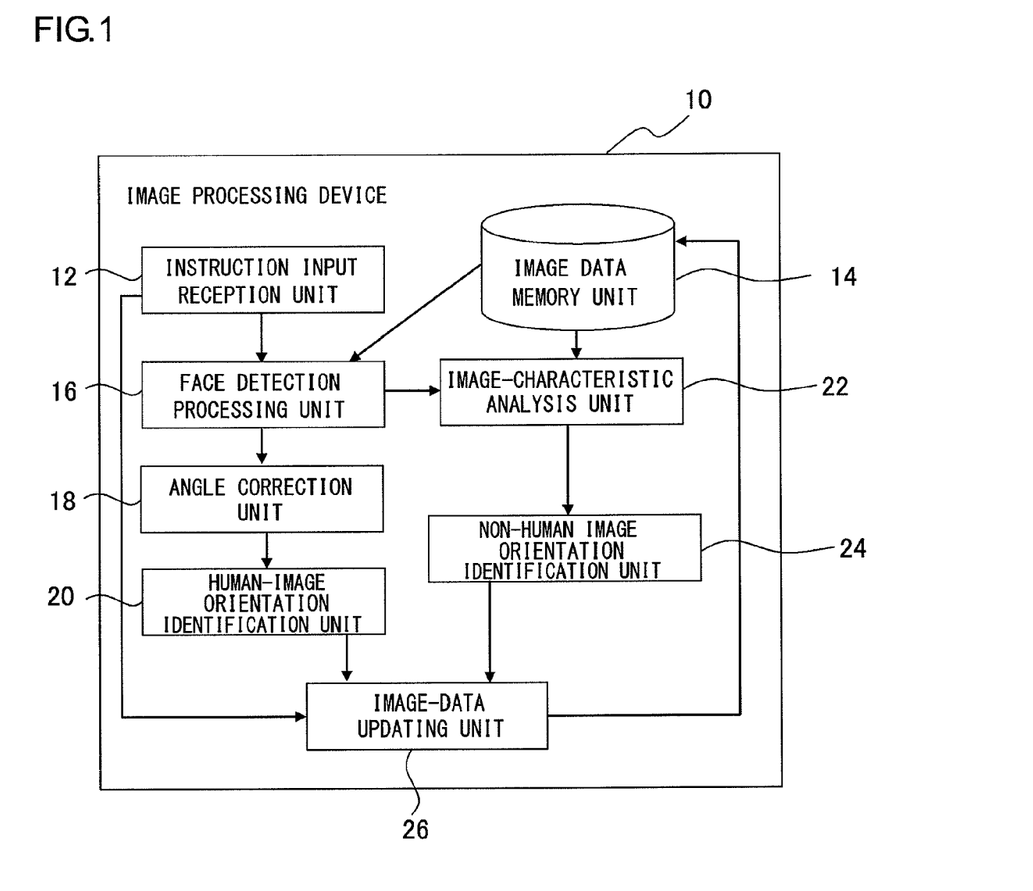
FIG. 1 is a diagram illustrating the configuration of an image processing device in the embodiment.

FIG. 1 illustrates the configuration of an image processing device in the embodiment. An image processing device 10 comprises: an instruction input reception unit 12 for receiving from the user a specification or the like of image data to be processed; a face detection processing unit 16 for performing a face detection process with rotating an image in increments of a predetermined angle and acquiring an angle at which a face is detected; an angle correction unit 18 for acquiring an angle between the face and a shoulder by pattern matching and correcting a rotation angle; a human-image orientation identification unit 20 for identifying a correct orientation of a human image based on the rotation angle; an image-characteristic analysis unit 22 for acquiring frequency and brightness distribution characteristics of the image; a non-human image orientation identification unit 24 for identifying a correct orientation of a non-human image based on the inclinations of frequency and brightness distribution characteristics; and an image-data updating unit 26 for eventually reflecting information regarding the correct orientation in the image data.

The instruction input reception unit 12 is an input device that receives from the user an input for specifying image data to be processed. An image to be processed may be either a still image or a moving image. If the image is a still image, a single image or a plurality of images may be used. A production method of the image is not particularly limited, and computer graphics, a computerized hand-drawn picture, or the like may be used as well as a photograph, in which a real world is being captured, and a video image. The instruction input reception unit 12 further receives an input indicating whether or not to accept modification of the image data by the image-data updating unit 26. The instruction input reception unit 12 may be a commonly-used input device such as a keyboard, a button, a touch panel, and a mouse or a combination of a display device and an input device.

An image data memory unit 14 is a memory device in which the image data to be processed is stored. The face detection processing unit 16 reads out the specified image data from the image data memory unit 14 and performs a face detection process. The same process is repeatedly performed on each of a plurality of specified images in the case when there are a plurality of specified images or performed on each frame image or on a marked frame image or the like in the case of a moving image.

In performing face detection using a commonly-used method, whether or not there is a face in the image is determined by performing pattern matching with an image prepared in advance, taking into account a face-shade characteristic pattern. In such a method, a reference image of a face in a state where the head faces up and the chin faces down is normally used for matching. For example, in an image where a face is upside down, matching fails, and a face is thus not detected. In the embodiment, this orientation dependency in face detection is utilized.

More specifically, the image is rotated in increments of a predetermined angle on a display plane so as to perform face detection. If the image is a human image, a face is detected at any rotation angle. Due to the above-stated orientation dependency in the face detection, an axis in a vertical direction of the face, obtained while the head is facing up, almost matches with the vertical axis of the display plane at this time. In a human image, the top and bottom direction of a body often times corresponds to the top and bottom direction of the image, i.e., the axis of the body while the head is facing up is in the vertical direction of the image. If the axis of the body and the axis of the face in the vertical direction are almost in the same direction, it is considered that the orientation of an image obtained when the face is detected is close to the correct orientation of the image. As described, the face detection processing unit 16 approximates the correct orientation of an image based on an angle of a face using the characteristics of face detection. Therefore, the face detection process performed by the face detection processing unit 16 uses a commonly-used method, such as a method according to the above-stated pattern matching, used on the assumption that a non-tilted face is detected.

The angle correction unit 18 uses a result of the face detection performed by the face detection processing unit 16 so as to identify an angle between the horizontal axis of the shoulders of a human figure and an axis of the face in the vertical direction by pattern matching and then corrects, based on the identified angle, the rotation angle of the image obtained when the face is detected. Since the horizontal axis of the shoulders is perpendicular to the axis of the body, the axis of the body and the vertical axis of the display plane can be aligned by this correction, thus absorbing an error generated by a difference in direction between the axis of the face and the axis of the body, e.g., when the face is tilted in an extreme manner. If a plurality of people are being captured, the face detection processing unit 16 and the angle correction unit 18 perform the same process for each face that is detected.

In the following explanation, a rotation angle at which a face is detected or obtained after the correction is referred to as a "rotation angle." This angle indirectly represents an angle of a person in an image in the original orientation. The correct orientation of the image to be identified at the end is an orientation obtained by rotating the image in increments of 90 degrees, and the orientation is hereinafter referred to as a "correct orientation of the image." The human-image orientation identification unit 20 identifies the correct orientation of the image based on a rotation angle as corrected of the human image in which the face is detected. If a plurality of people are being captured, the correct orientation of the image is identified based on a value obtained by averaging respective rotation angles.

The image-characteristic analysis unit 22 acquires a frequency distribution and a brightness distribution for an image in which a face is not detected at any angle by the face detection processing unit 16, i.e., a non-human image. In an image of a landscape photograph or an image in which the interior of a room is captured, the sky or a ceiling is often located on the upper side of the image. In general, the sky or a ceiling is bright due to the existence of the sun or illumination, and there is less high frequency component since there is no object. The image-characteristic analysis unit 22 thus acquires distribution characteristics in a predetermined axis direction from each distribution. The non-human image orientation identification unit 24 identifies the correct orientation of the image by comparing the overall inclination of the distribution characteristics among axes.

As described above, the human-image orientation identification unit 20 and the non-human image orientation identification unit 24 basically determine the correct orientation of the image in increments of 90 degrees from the original orientation of the image. Meanwhile, if a person is desired to be displayed in a vertical direction for image effects, another angle may be determined as the correct orientation of the image. The image-data updating unit 26 incorporates an orientation thus determined in the image data and stores the image data in the image data memory unit 14. In this stage, the image data itself may be modified, e.g., the sequence of pixels in raster order is changed to have a sequence in the correct orientation of the image. Alternatively, correct angle information may be added to the image data so that the angle information is incorporated for display later. Before processing the image data as described, the image-data updating unit 26 prompts the user to provide final judgment by displaying information accordingly on a display device.

Figure 2:
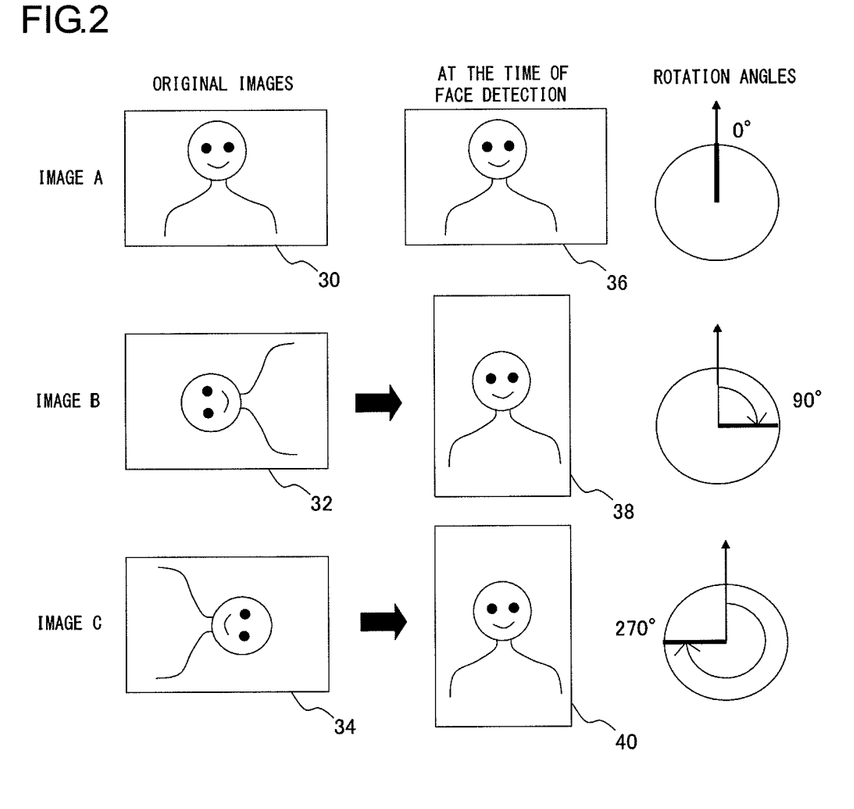
FIG. 2 is a diagram for explaining a principle of identifying a correct orientation of an image by a face detection process in the embodiment.

An explanation is now given regarding a method for identifying a correct orientation of a human image by the face detection processing unit 16, the angle correction unit 18, and the human-image orientation identification unit 20. FIG. 2 is a diagram for explaining a principle of identifying a correct orientation of an image by a face detection process. Three images 30, 32, and 34 in the left row of the figure are images, an "image A," an "image B," and an "image C," which are before the process and stored in the image data memory unit 14, respectively. As shown in the figure, the images are generally recorded in the orientation such that the images are long in a horizontal direction. However, depending on how a camera is held during image capturing, three patterns can be possible where the orientation is correct (image A), where the side of the image that should be located on the top is located on the left (image B), and where the side of the image that should be located on the top is located on the right (image B).

A situation where an image becomes upside down is not shown since it is rare because of the way the camera is operated. However, the following process can be similarly performed even in this case. In order to distinguish among these patterns to identify the correct orientation, the face detection processing unit 16 performs a face detection process by rotating an image in increments of a predetermined angle and records a rotation angle at which a face is detected. Three images 36, 38, and 40 in the middle row of FIG. 2 represents images obtained when a face is detected after rotating the "image A," the "image B," and the "image C," respectively. The right row represents respective rotation angles of the images at that time. In the figure, a rotation angle is measured in a clockwise rotation, the rotation angle being zero degree in the upper direction of the figure.

In the case of the "image A," since the original image 30 is in the correct orientation, a face is detected in the image 36 before rotation. Therefore, the rotation angle is zero degree. In the case of the "image B," a face is detected when the rotation angle is 90 degrees. In the case of the "image C," a face is detected when the rotation angle is 270 degrees. Therefore, the images can be always presented in the correct orientation for display by adding information to the image data so that the images B and C are rotated by 90 degrees and 270 degrees, respectively, or by updating the image data itself.

Figure 3:
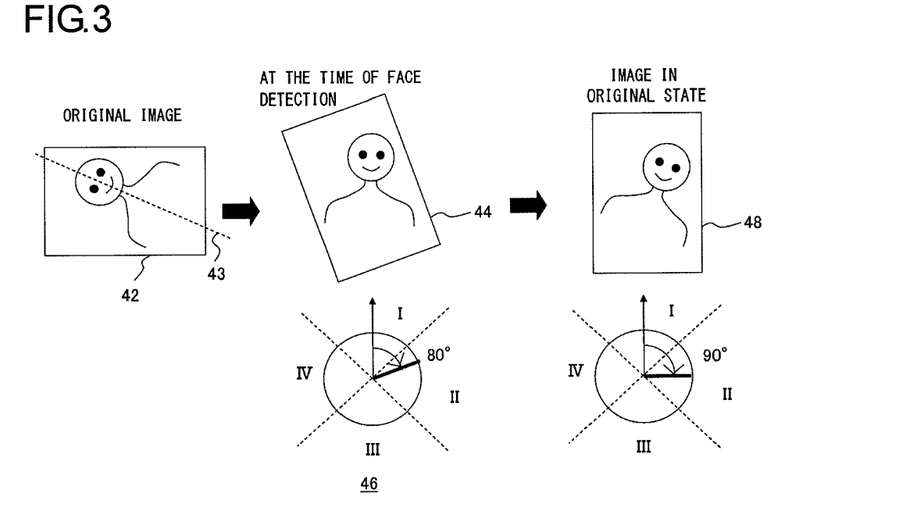
FIG. 3 is a diagram for explaining a method for identifying a correct orientation of an image in the embodiment.

In the case of FIG. 2, the axis of a face in a vertical direction of a human figure matches with an axis of an image in the vertical or horizontal direction in all the three images. Thus, a face can be detected at a rotation angle obtained in increments of 90 degrees, and the rotation angle can thus represent a final orientation of an image. On the other hand, in an actual image, the axis of a face in a vertical direction is often tilted with respect to the image due to a subject moving or posing. FIG. 3 is a diagram for explaining a method for identifying a correct orientation of an image in consideration of such a case.

In an original image 42 in the figure, an axis 43 of a face in a vertical direction does not match with an axis of the image in a vertical direction or horizontal direction. In such an image, a face is detected at an angle different from a rotation angle obtained in increments of 90 degrees, as shown in an image 44 obtained at the time of face detection. Therefore, a rotation angle is divided into four areas, and the final orientation of the image is identified based on a range in which a rotation angle obtained at the time of detection is located. For example, as shown in rotation angle coordinates 46 in the figure, quadrants are defined as follows: a first quadrant includes an angle θ from 315 degrees to less than 45 degrees; a second quadrant includes an angle θ from 45 degrees to less than 135 degrees; a third quadrant includes an angle θ from 135 degrees to less than 225 degrees; and a fourth quadrant includes an angle θ from 225 degrees to less than 315 degrees.

The final correct orientation of the image is determined to be zero degree when a rotation angle θ is in the first quadrant, 90 degrees when a rotation angle θ is in the second quadrant, 180 degrees when a rotation angle θ is in the third quadrant, and 270 degrees when a rotation angle θ is in the fourth quadrant. In the image 44 in FIG. 3, if a face is detected when the rotation angle θ is 80 degrees, the correct image is determined to be an image 48 that is obtained by rotating the image by 90 degrees since the rotation angle is in the second quadrant. By determining an angle area as described above, an error caused by an angular width of a face that can be detected in the face detection process. Based on the rotation angle of the image at the time of the face detection shown in FIG. 3, a process for determining the final orientation of the image obtained in increments of 90 degrees is actually performed by the human-image orientation identification unit 20 after a correction using an angle between a head and a shoulder that is described in the following.

Figure 4:
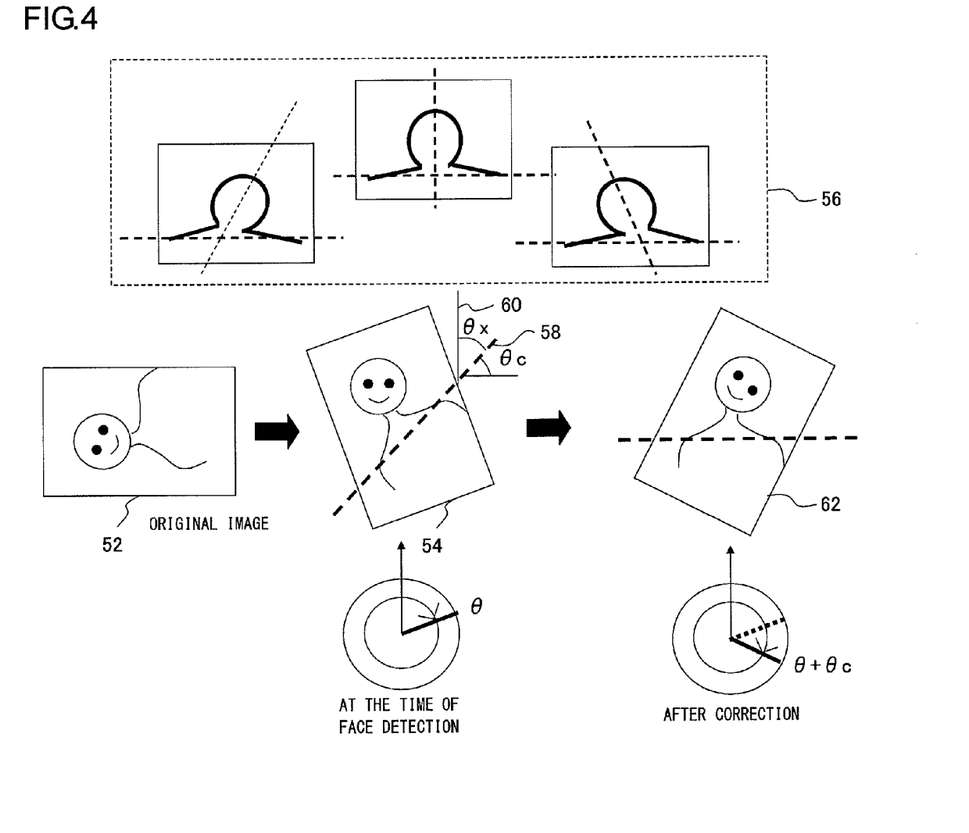
FIG. 4 is a diagram for explaining a method for correcting a rotation angle by using an angle between a head and a shoulder that is performed by an angle correction unit in the embodiment.

FIG. 4 is a diagram for explaining a method for correcting a rotation angle by using an angle between a head and a shoulder that is performed by the angle correction unit 18. This correction serves to improve the accuracy by taking into account an element of a body axis in a process for estimating a correct orientation of an image based on an axis of a face in a vertical direction that is described thus far. It is assumed that an original image 52 is first rotated as described above such that a face is detected at a rotation angle θ as in an image 54. As shown in the figure, since a neck of a human figure is tilted, although an axis of the face in a vertical direction matches with a vertical axis of a display plane, a body axis, which serves as a reference for indicating a correct orientation of an image, does not match with the vertical axis of the display plane.

The angle correction unit 18 identifies an angle between the head and the shoulder by matching the image 54 in which the face is detected against a template image 56 prepared in advance that shows a contour shape of a head and shoulders so as to obtain a rotation angle at which an axis of a person matches with the vertical axis of the display plane based thereon. As template images 56, a plurality of images are prepared in which an angle between an axis of a head part in a vertical direction and a horizontal axis of the shoulders is changed in stages. A template image is determined that has the most closely matching shoulder line when the respective head parts of the template images 56 are matched against a face area of the image 54 for which the face is detected. With this, a tilt of the axis of the face in a vertical direction with respect to the horizontal axis of the shoulders in the image can be identified.

A correction angle θc is obtained as follows using a thus-obtained angle θx between a solid line 60, which is the axis of the face in the vertical direction, and a horizontal axis of the shoulders 58:

$$\theta c = 90° - \theta x$$

In other words, when the image 54 is rotated by θc degrees, an image 62 can be obtained in which the body axis matches with the vertical axis of the display plane. The correct image orientation of the human image can be obtained by performing four-quadrant determination shown in FIG. 3 by the human-image orientation identification unit 20 based on a rotation angle θ+θc at this time.

Figure 5:
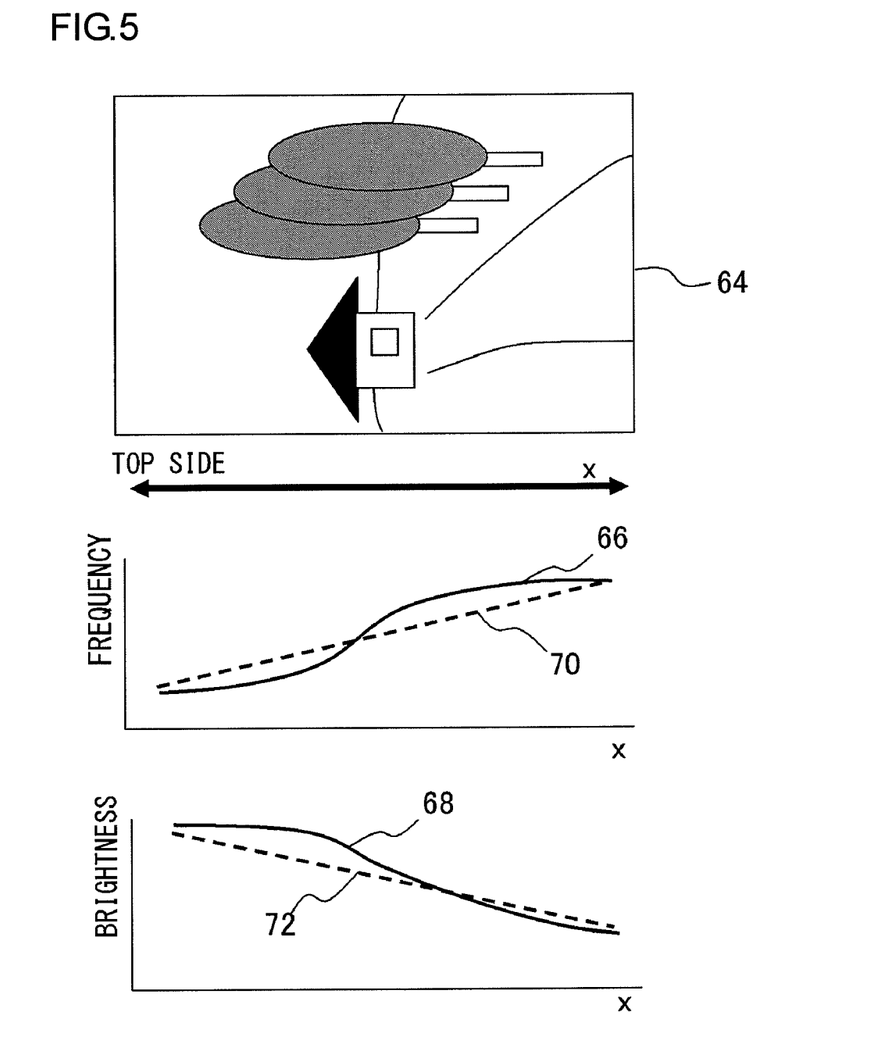
FIG. 5 is a diagram for explaining inclinations of frequency and brightness distribution characteristics of a non-human image that are used in the embodiment.

An explanation is now given regarding a method for identifying a correct orientation of a non-human image by the image-characteristic analysis unit 22. FIG. 5 is a diagram for explaining inclinations of frequency and brightness distribution characteristics of a non-human image. In the figure, an image 64 is a non-human image such as a landscape photograph. As shown in the figure, the image of which axis should be displayed in vertical direction, is displayed with the axis in a horizontal direction of a display plane, i.e., an x axis. When a frequency distribution and a brightness distribution are acquired for such an image, there is a tendency that brightness is higher and that there is less high frequency component in the upper area of the image in correct orientation compared to other areas. This is because an upper area of an image is generally a bright and wide area such as the sky and a ceiling, as described above. Therefore, frequency and brightness distribution characteristics with respect to an x axis are acquired for the image 64 as shown in the figure.

In other words, a value in an average value distribution 66 of a frequency decreases toward the upper side of the correct image, i.e., in a direction where an x-coordinate value decreases. On the contrary, a brightness distribution 68 increases in a direction where an x-coordinate value decreases. The average value distribution 66 of a frequency and the brightness distribution 68 are approximated by straight lines, as shown by dashed lines 70 and 72, respectively, using a least-square method so as to obtain respective inclinations. When the inclinations of respective approximate straight lines of the frequency distribution and the brightness distribution are expressed as Af and Ay, respectively, an evaluation value V is obtained by weighted summation on these inclinations as follows:

$$V=Wf*Af+Wy*Ay$$

In this case, Wf and Wy represent weights for unifying scales of the inclinations Af and Ay and then incorporating the inclinations in the evaluation value V and are determined in advance using a test image. As shown in the figure, the inclination Af of the frequency distribution and the inclination Ay of the brightness distribution are values whose positivity and negativity are opposite. Thus, by appropriately setting a coefficient, the evaluation value V will become close to zero. The evaluation value V is calculated for the vertical and horizontal directions of the image. The correct orientation of the image is identified on the assumption that an axis with the smallest V value is the true vertical axis of the image and that a direction in which the inclination Af of the frequency distribution becomes positive or a direction in which the inclination Ay of the frequency distribution becomes negative is the true up-to-down direction of the image. By focusing on an inclination of a frequency or brightness as described above, even when an absolute value of the frequency or brightness is changed due to, e.g., a light source environment of an image, an orientation can be identified without getting affected by such change.

In the case of an image where the upper side is dark, such as an image in which a nightscape is captured, distribution characteristics of brightness are different from those shown in FIG. 5. The image-characteristic analysis unit 22 first checks a time zone for image capturing in consideration of such a situation. A time zone for image capturing can be acquired by reading out additional information, which is automatically recorded by a device in the case when the image capturing is carried out by a digital camera or the like. If an image-capturing time is not a night time, an inclination is evaluated by the above evaluation value V. Alternatively, the user may input the information, for example, when specifying data of an image to the instruction input reception unit 12.

On the other hand, if an image-capturing time is a night time and if the brightness of the entire image is smaller than a predetermined threshold value, the image is determined to be an image in which a nightscape is captured. In this case, there is a tendency that the upper side of the image becomes darker, as described above, and the positivity and negativity of an inclination Ay of brightness is thus determined to become opposite from that of a daytime image. Accordingly, an evaluation value V is obtained as follows:

$$V=Wf*Af-Wy*Ay$$

Even if image capturing is conducted at night time, an image is determined to be, e.g., an interior image where there is illumination on the top, if the brightness is the threshold value or greater, and the same equation for an evaluation value as that for a daytime is used.

Figure 6:
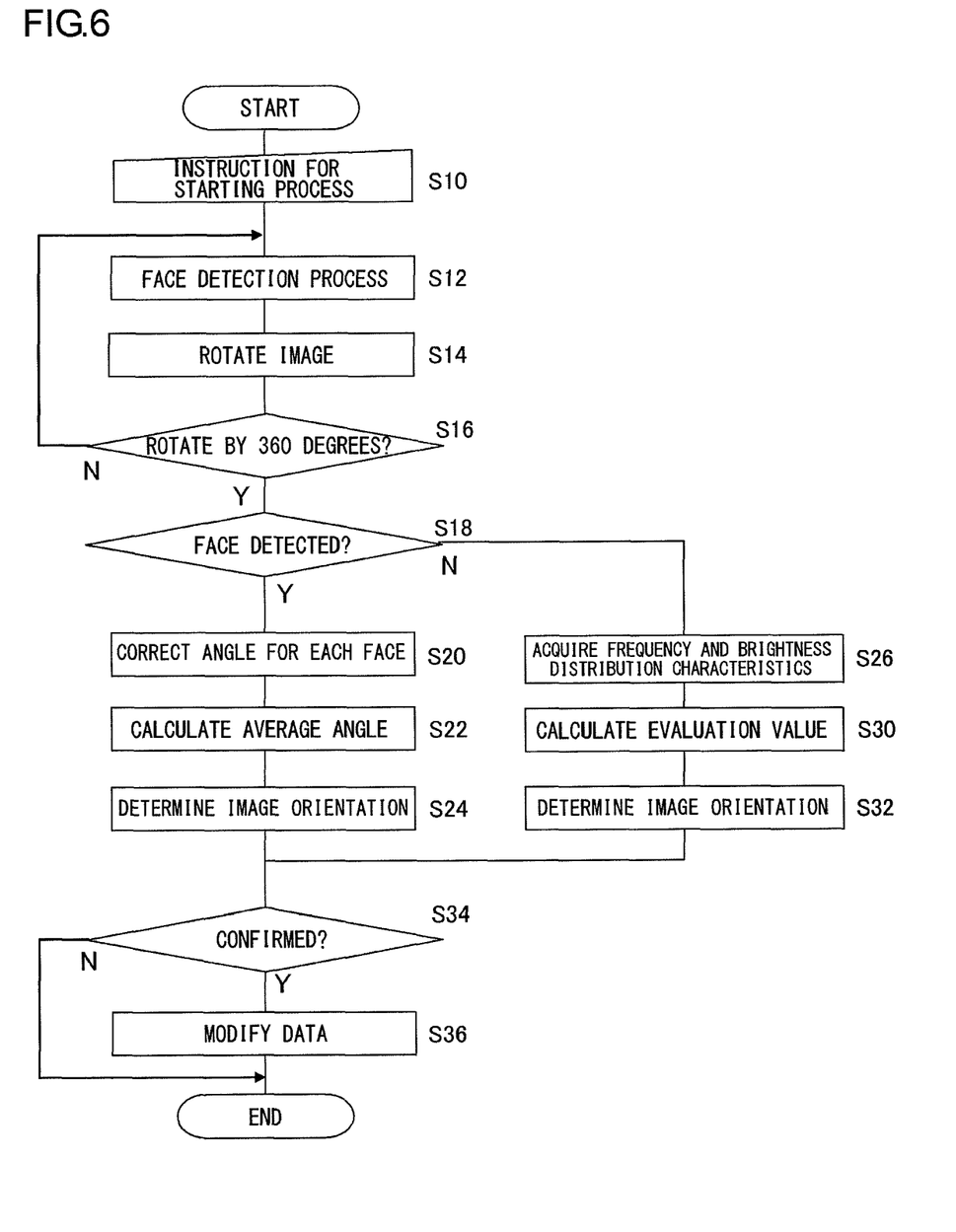
FIG. 6 is a flowchart illustrating a processing procedure for identifying a correct orientation of an image and modifying data in the embodiment.

A detailed description will now be made of the operation by the configurations described thus far. FIG. 6 is a flowchart illustrating a processing procedure for identifying a correct orientation of an image and modifying data by the image processing device 10. First, when the user specifies image data and inputs an instruction for starting a process to the instruction input reception unit 12 (S10), the face detection processing unit 16 reads out the specified image data from the image data memory unit 14 and performs a face detection process (S12).

Then, the image is rotated by a predetermined rotation angle such as 45 degrees or 90 degrees (S14), and the face detection process is performed on the image again (S14, N in S16, and S10). An increment of the rotation angle is appropriately determined in consideration of required accuracy and computational load. This process is repeated until the image is rotated by 360 degrees. If a face is detected at any angle in the face detection process in S12, the position and the rotation angle of the face are recorded. However, since there is a possibility that another person is being captured, the face detection process is continuously performed until the angle reaches 360 degrees. If the face detection process is continuously performed until the image is rotated by 360 degrees (Y in S16), the image is determined to be either a human image or a non-human image based on whether or not a face is detected even for once during the time between.

If a face is detected (Y in S18), the angle correction unit 18 obtains an angle between an axis of the face in a vertical direction and a horizontal axis of shoulders by matching a face area recorded in S12 against a template image prepared in advance that has a contour shape of a head and the shoulders so as to correct the rotation angle in accordance with a result thereof (S20). If a plurality of faces are detected in S12, the process is performed for each face. Then, when a plurality of faces are detected, the human-image orientation identification unit 20 averages respective rotation angles of the image obtained for the faces using the following equation (S22).

$$\theta ave=\Sigma\theta n/N$$

In this equation, θave is an average value of the rotation angles that is to be obtained, θn is a rotation angle obtained for an nth face, and N is the total count of the faces. By finding out an angle area, such as four quadrants shown in FIG. 3, to which the rotation angle of the image obtained or the average value of the rotation angles of the image belongs, the correct orientation of the image can be determined (S24).

On the other hand, if no face is detected even for once (N in S18), the image-characteristic analysis unit 22 acquires distribution characteristics of a frequency distribution and a brightness distribution for a vertical direction and a horizontal direction of the image (S26). Then, based on respective inclinations obtained when the distribution characteristics are approximated by respective straight lines, the above evaluation value V is calculated (S30). If the image is determined to be a nightscape image based on an image-capturing time and an absolute value of brightness at this time, as described above, the evaluation value V is calculated using a coefficient for the inclination of the brightness as a negative value. The non-human image orientation identification unit 24 then determines the correct orientation of the image by identifying the top and bottom of the image based on the evaluation value V and the inclination of the frequency distribution (S32).

The image-data updating unit 26 then asks the user for confirmation by, e.g., displaying on a display device the image rotated to an orientation determined to be the correct orientation. If the user confirms the rotation of the image to the displayed orientation (Y in S34), a result of the determination is incorporated in the image data by adding information regarding the orientation to the image data or by changing a pixel value sequence of the image data (S36). If the user rejects (N in S34), the process is ended.

Figure 7:
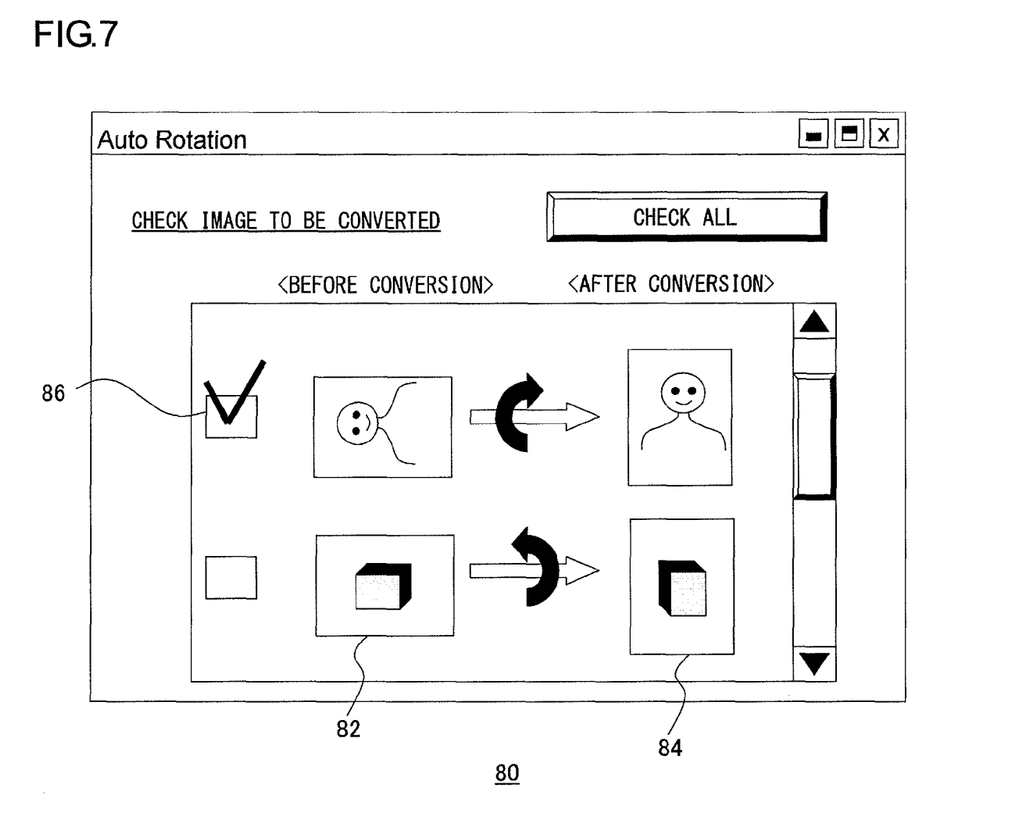
FIG. 7 shows an example of a screen for presenting to a user an image rotated to an orientation determined to be a correct orientation in the embodiment.

FIG. 7 illustrates an example of a screen to be presented to the user in S34. An image-orientation confirmation screen 80 comprises an image display column 82 for an image before conversion and an image display column 824 for an image after conversion. In the image display column 82 for an image before conversion, an image to be processed is displayed in the original orientation. In the image display column 84 for an image after conversion, an image rotated to an orientation considered as a correct orientation is displayed. Note that a result of the determination is not incorporated in the image data yet at this point.

When the user enters, via the instruction input reception unit 12, an instruction input for determination by checking a check box 86 that corresponds to each image displayed on the screen, the image-data updating unit 26 incorporates a result of the determination for a checked image in the image data. The data of an image that is not checked will not be modified. As described, by presenting a result of determination to the user before the actual modification of the image data, the image can be prevented from being displayed in an orientation unintended by the user.

According to the above-described embodiment, a face detection process is performed by rotating an image in increments of a predetermined angle, and a rotation angle at which a face is detected is recorded. Since this angle is in an orientation in which an axis of a face in a vertical direction matches with a vertical axis of a display, it can be considered that the angle roughly shows a correct orientation of the image. By obtaining an angle between the axis of the face in the vertical direction and a horizontal axis of shoulders by pattern matching using a face detection result, a state where a body axis matches with the vertical axis of the display plane can be easily created.

Since a body axis is roughly in a vertical direction in most photographs, a correct orientation of an image can be easily identified by this. Even when a plurality of people are being captured, correct rotation angles are identified for respective faces, and the accuracy of orientation determination can be improved by averaging the rotation angles. With this, a correct orientation of an image can be easily identified by a similar process without restricting an image-capturing environment, the number of subjects, the posture of subjects, and the like.

If a face is not detected, the image is determined to be a non-human image, and a frequency distribution and a brightness distribution of the image are obtained. Taking advantage of the fact that brightness tends to become higher and there tends to be less high frequency component in the upper area of an image in a landscape photograph or the like, the top and bottom of the image are identified based on distribution characteristics with respect to a vertical axis and a horizontal axis and on an approximate inclination thereof. With this, even for an image in which a face is not detected, a correct orientation of the image can be identified without being affected by a change in a detailed part of the image and a change in an image-capturing environment.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

For example, the image processing device 10 in FIG. 1 is provided only with a module for determining a correct orientation of an image. However, the image processing device may further include a module for displaying and printing with use of a determination result such as a module for creating and displaying a slide show, a module for displaying and printing a thumbnail, and the like. The image processing device may be built in an image-capturing device such as a camera so that an orientation of an image is determined along with image capturing.

In the embodiment, image data in which a correct orientation is incorporated is stored. Alternatively, if a module described in the embodiment is integrally provided with a display module for displaying an image, a determination result may not be stored, and an angle may be determined for each display occasion so as to display the image after providing appropriate rotation in the display module by providing, to the display module, the identification information of the image necessary to be rotated and a rotation angle thereof.

Furthermore, in the embodiment, a face detection process is performed on a target image, and a correct orientation of the image is identified based on an angle of the image obtained when a face is detected. By performing a process similar to this, a correct orientation can be also identified even in an image other than a human image. In this case, a reference image is prepared in advance for an object used in place of a face with a fixed angle, and pattern matching is performed against the foreground of the image to be processed, which is extracted by a foreground extraction process or the like while rotating the image. A correct orientation of the image to be processed is identified based on an angle at which the object is detected upon success of the matching. With this, even in the case of a vehicle, a building, etc., an orientation of an image can be determined based on the shape thereof. Furthermore, the accuracy of the identification may be improved by combining this method and the method for identifying an orientation for a non-human image that is described in the embodiment.

Furthermore, pattern matching may be performed by rotating a reference image instead of an image to be processed in the case of face detection and in the case of detection of other objects. Alternatively, the both images may be rotated. In either case, if a relative angle, which is obtained when an object is detected, between an image to be processed and a reference image whose top side and bottom side are known is identified, the top and bottom of the image to be processed can be identified as explained in the embodiment. For example, by determining an image to be rotated in consideration of computational costs required for the rotation, an increase in computational costs can be prevented, e.g., even when an image to be processed is high definition having a notably large data size.

DESCRIPTION OF THE REFERENCE NUMERALS 10 image processing device
12 instruction input reception unit
14 image data memory unit
16 face detection processing unit
18 angle correction unit
20 human-image orientation identification unit
22 image-characteristic analysis unit
24 non-human image orientation identification unit
26 image-data updating unit
80 image-orientation confirmation screen

INDUSTRIAL APPLICABILITY

As described above, the present invention is applicable to information processing devices such as computers, portable phones, digital cameras, video cameras, and the like.

The invention claimed is:

1. An image processing device comprising:
an object detection processing unit configured to detect, by performing pattern matching between a preexisting image containing an object to be processed and a reference image of the object, the object in the image to be processed, while changing the relative angle of the images;
an object-image orientation identification unit configured to determine the top and the bottom of the preexisting image corresponding to the top and the bottom of the object, based on the relative angle at which the object is detected by the object detection processing unit, so as to identify a correct orientation of the preexisting image;
wherein the object detection processing unit performs a process for detecting a face as the object; and
an angle correction unit configured to obtain an angle between an axis of the face in a vertical direction and a horizontal axis of shoulders in the image by matching, against a face area of the preexisting image when the face is detected by the object detection processing unit, a plurality of reference images in which tilt of a head with respect to shoulders is changed in stages while showing contour of the head and the shoulders so as to correct the relative angle at which the face is detected; and
an image-data updating unit configured to update the preexisting image so that the image is displayed in the identified orientation.

2. The image processing device according to claim 1, wherein the object detection processing unit records, for each of a plurality of objects captured in the preexisting image, the relative angle at which a corresponding object is detected, and
wherein the image orientation identification unit identifies a correct orientation of the preexisting image based on an average value of respective relative angles recorded for the plurality of objects.

3. The image processing device according to claim 1, wherein, if it is determined that a nightscape was captured in the preexisting image based on the brightness of the image and on an image-capturing time of the preexisting image that is recorded along with image capturing, the non-object image orientation identification unit changes the sign of the inclination of the brightness in the evaluation value to be opposite from that in other cases.

4. The image processing device according to claim 1, wherein the image-data updating unit asks the user for confirmation of orientation by displaying on a display device an image-orientation confirmation screen displaying the preexisting image to be processed in an original orientation side by side with the preexisting image to be processed in the orientation identified by the object-image orientation identification unit so as to update the preexisting image upon receiving confirmation from the user.

5. The image processing device according to claim 1, wherein the preexisting image to be processed is a frame image included in a moving image.

6. An image processing method comprising:
reading out data of a specified image containing an object from a computer readable non-transitory memory device and then detecting, by performing pattern matching between the image and a reference image of the object, the object in the image, while changing a relative angle of the images;
determining the top and the bottom of the image corresponding to the top and the bottom of the object, based on the relative angle at which the object is detected, so as to identify a correct orientation of the image;
detecting a face as the object
obtaining an angle between an axis of the face in a vertical direction and a horizontal axis of shoulders in the image by matching, against a face area of the preexisting image when the face is detected, a plurality of reference images in which tilt of a head with respect to shoulders is changed in stages while showing contour of the head and the shoulders so as to correct the relative angle at which the face is detected; and
updating the data of the image so that the image is displayed in the identified orientation.

7. A computer program embedded in a non-transitory computer readable recording medium, comprising:
an object detection processing module configured to read out data of a specified image containing an object from a memory device and then to detect, by performing pattern matching between the image and a reference image of the object, the object in the image, while changing a relative angle of the images;
an object-image orientation identification module configured to determine the top and the bottom of the image corresponding to the top and the bottom of the object, based on the relative angle at which the object is detected, so as to identify a correct orientation of the image;
wherein the object detection processing module performs a process for detecting a face as the object; and
an angle correction module configured to obtain an angle between an axis of the face in a vertical direction and a horizontal axis of shoulders in the image by matching, against a face area of the preexisting image when the face is detected by the object detection processing module, a plurality of reference images in which tilt of a head with respect to shoulders is changed in stages while showing contour of the head and the shoulders so as to correct the relative angle at which the face is detected; and
an image-data updating module configured to update the data of the image so that the image is displayed in the identified orientation.

8. A non-transitory computer-readable recording medium having embodied thereon a computer program product comprising:
an object detection processing module configured to read out data of a specified image containing an object from a memory device and then to detect, by performing pattern matching between the image and a reference image of the object, the object in the image, while changing a relative angle of the images;
an object-image orientation identification module configured to determine the top and the bottom of the image corresponding to the top and the bottom of the object, based on the relative angle at which the object is detected, so as to identify a correct orientation of the image;
wherein the object detection processing module performs a process for detecting a face as the object; and
an angle correction module configured to obtain an angle between an axis of the face in a vertical direction and a horizontal axis of shoulders in the image by matching, against a face area of the preexisting image when the face is detected by the object detection processing module, a plurality of reference images in which tilt of a head with respect to shoulders is changed in stages while showing contour of the head and the shoulders so as to correct the relative angle at which the face is detected; and an image updating module configured to update the data of the image so that the image is displayed in the identified orientation.

9. An image processing device comprising:

an object detection processing unit configured to detect, by performing pattern matching between a preexisting image containing an object to be processed and a reference image of the object, the object in the image to be processed, while changing the relative angle of the images;

an object-image orientation identification unit configured to determine the top and the bottom of the preexisting image corresponding to the top and the bottom of the object, based on the relative angle at which the object is detected by the object detection processing unit, so as to identify a correct orientation of the preexisting image;

an image-characteristic analysis unit configured to acquire a frequency distribution and a brightness distribution of the preexisting image, if an object is not detected at any relative angle by the object detection processing unit, so as to acquire respective inclinations obtained when distribution characteristics with respect to a vertical axis and a horizontal axis of the preexisting image after approximating the respective distributions by respective straight lines; and a non-object image orientation identification unit configured to determine the top and the bottom of the preexisting image, based on an evaluation value for each axis that is obtained by weighted summation of the respective inclinations of the frequency distribution characteristics and the brightness distribution characteristics both obtained by the image-characteristic analysis unit and based on the inclinations, so as to identify a correct orientation of the preexisting image; and an image-data updating unit configured to update the preexisting image so that the image is displayed in the identified orientation.

10. An image processing method comprising:

reading out data of a specified image containing an object from a computer readable non-transitory memory device and then detecting, by performing pattern matching between the image and a reference image of the object, the object in the image, while changing a relative angle of the images;

determining the top and the bottom of the image corresponding to the top and the bottom of the object, based on the relative angle at which the object is detected, so as to identify a correct orientation of the image;

acquiring a frequency distribution and a brightness distribution of the preexisting image, if an object is not detected at any relative angle, so as to acquire respective inclinations obtained when distribution characteristics with respect to a vertical axis and a horizontal axis of the preexisting image after approximating the respective distributions by respective straight lines;

determining the top and the bottom of the preexisting image, based on an evaluation value for each axis that is obtained by weighted summation of the respective inclinations of the frequency distribution characteristics and the brightness distribution characteristics and based on the inclinations, so as to identify a correct orientation of the preexisting image; and updating the data of the image so that the image is displayed in the identified orientation.

11. A computer program embedded in a non-transitory computer readable recording medium, comprising:

an object detection processing module configured to read out data of a specified image containing an object from a memory device and then to detect, by performing pattern matching between the image and a reference image of the object, the object in the image, while changing a relative angle of the images;

an object-image orientation identification module configured to determine the top and the bottom of the image corresponding to the top and the bottom of the object, based on the relative angle at which the object is detected, so as to identify a correct orientation of the image;

an image-characteristic analysis module configured to acquire a frequency distribution and a brightness distribution of the preexisting image, if an object is not detected at any relative angle by the object detection processing module, so as to acquire respective inclinations obtained when distribution characteristics with respect to a vertical axis and a horizontal axis of the preexisting image after approximating the respective distributions by respective straight lines;

a non-object image orientation identification module configured to determine the top and the bottom of the preexisting image, based on an evaluation value for each axis that is obtained by weighted summation of the respective inclinations of the frequency distribution characteristics and the brightness distribution characteristics both obtained by the image-characteristic analysis module and based on the inclinations, so as to identify a correct orientation of the preexisting image; and an image-data updating module configured to update the data of the image so that the image is displayed in the identified orientation.

12. A non-transitory computer-readable recording medium having embodied thereon a computer program product comprising:

an object detection processing module configured to read out data of a specified image containing an object from a memory device and then to detect, by performing pattern matching between the image and a reference image of the object, the object in the image, while changing a relative angle of the images;

an object-image orientation identification module configured to determine the top and the bottom of the image corresponding to the top and the bottom of the object, based on the relative angle at which the object is detected, so as to identify a correct orientation of the image;

an image-characteristic analysis module configured to acquire a frequency distribution and a brightness distribution of the preexisting image, if an object is not detected at any relative angle by the object detection processing module, so as to acquire respective inclinations obtained when distribution characteristics with respect to a vertical axis and a horizontal axis of the preexisting image after approximating the respective distributions by respective straight lines;

a non-object image orientation identification module configured to determine the top and the bottom of the preexisting image, based on an evaluation value for each axis that is obtained by weighted summation of the respective inclinations of the frequency distribution characteristics and the brightness distribution characteristics both obtained by the image-characteristic analysis module and based on the inclinations, so as to identify a correct orientation of the preexisting image; and an image updating module configured to update the data of the image so that the image is displayed in the identified orientation.

* * * * *